United States Patent
Green et al.

(10) Patent No.: US 12,427,614 B1
(45) Date of Patent: Sep. 30, 2025

(54) PROTECTIVE VIEWING SCREENS

(71) Applicants: Brandan Green, Hurricane, UT (US);
Sharalyn Green, Hurricane, UT (US)

(72) Inventors: Brandan Green, Hurricane, UT (US);
Sharalyn Green, Hurricane, UT (US)

( * ) Notice: Subject to any disclaimer, the term of this patent is extended or adjusted under 35 U.S.C. 154(b) by 0 days.

(21) Appl. No.: 19/060,669

(22) Filed: Feb. 22, 2025

(51) Int. Cl.
| | |
|---|---|
| *B23Q 11/08* | (2006.01) |
| *B23K 9/32* | (2006.01) |
| *B23K 37/006* | (2025.01) |
| *F16P 1/06* | (2006.01) |

(52) U.S. Cl.
CPC .......... *B23Q 11/0891* (2013.01); *B23K 9/322* (2013.01); *B23K 9/323* (2013.01); *B23K 37/006* (2013.01); *B23Q 11/0816* (2013.01); *F16P 1/06* (2013.01)

(58) Field of Classification Search
CPC ......... B23K 9/322; B23Q 11/0816; F16P 1/06
See application file for complete search history.

(56) References Cited

U.S. PATENT DOCUMENTS

| | | | | |
|---|---|---|---|---|
| 8,336,113 B2 * | 12/2012 | Uttrachi | ................. | A61F 9/067 2/7 |
| 10,667,952 B2 * | 6/2020 | Magnusson | ............. | A61F 9/067 |

FOREIGN PATENT DOCUMENTS

CN    214259642 U  *  9/2021

* cited by examiner

*Primary Examiner* — Vicky A Johnson
(74) *Attorney, Agent, or Firm* — Miller IP Law; Devin Miller (57) ABSTRACT

Described herein are apparatuses featuring a first and second dimming screen, each configured to darken prior to or during a welding operation. The first and second screens are contained in respective housings, connected via a hinge component allowing relative adjustment to position the screens at an angle for viewing of a weld area. Each housing includes a lighting element for illuminating a work area and an electrical connection for power. The apparatus also includes a flexible support structure for adjustably positioning the screens relative to the weld area, a mounting component to secure the apparatus to a surface, and a detachable connector for coupling the housings or their connection point to the support structure.

19 Claims, 5 Drawing Sheets

PROTECTIVE VIEWING SCREENS

BACKGROUND

The present disclosure relates generally to protective viewing screens, which are devices designed to enhance visibility and safety in various operational environments. These screens are utilized across industries such as manufacturing, medical, and construction, where operators require both clear visibility and protection from hazards like bright light, debris, or radiation. Protective viewing screens typically include shielding elements. Within this general field, the disclosure focuses on visibility-enhancing screens for welding and similar operations, where operators must work near intense light, heat, and hazardous materials while maintaining precise control over their tasks.

BRIEF DESCRIPTION OF THE DRAWINGS

The present description will be understood more fully when viewed with the accompanying drawings of examples of the protective viewing apparatus. The description is not meant to limit the protective viewing apparatus to the specific examples. Rather, the specific examples depicted and described are provided for explanation and understanding of the protective viewing apparatus. Throughout the description, the drawings may be referred to as drawings, figures, and/or FIGs. These drawings illustrate various embodiments and features of the protective viewing apparatus, including configurations, components, and operational methods, to aid in a comprehensive understanding of the invention and its potential applications.

DETAILED DESCRIPTION

A protective viewing apparatus as disclosed herein will become better understood by reviewing the following detailed description in conjunction with the figures. The detailed description and figures provide merely examples of the various embodiments of protective viewing apparatuses. Many variations are contemplated for different applications and design considerations; however, for brevity and clarity, all the contemplated variations may not be individually described in the following detailed description. Those skilled in the art will understand how the disclosed examples may be varied, modified, and altered and not depart in substance from the scope of the examples described herein.

A conventional welding visibility system may include a single darkening screen mounted on a fixed housing, often positioned directly in front of the welder's face to protect their eyes from harmful light and radiation while still allowing them to view the workpiece. Such systems are designed to provide a degree of safety and visibility but are usually constrained to a single-user configuration and lack adaptability for dynamic work environments.

Conventional systems often lack flexibility and versatility. They are typically limited to fixed positions, which may force operators to adopt uncomfortable postures or compromise on visibility when working on complex or large workpieces. The lack of independent control for multiple screens and limited lighting options also make these systems unsuitable for collaborative scenarios where an observer or secondary operator may need to view the weld area from a different angle. Furthermore, conventional systems rarely provide options for magnification or enhanced visibility, leaving opportunities to improve precision and efficiency untapped. These limitations highlight the need for more adaptable and customizable solutions to meet the diverse requirements of modern welding operations.

Implementations of an advanced welding visibility system may address some or all of the problems described above. Such a system may include multiple darkening screens, each housed within adjustable, interconnected housings that can pivot or rotate to accommodate various viewing angles. A flexible support structure with telescoping and repositioning capabilities may allow the screens to be positioned at optimal locations for both the welder and an observer. The system may also incorporate integrated lighting elements that operate independently of the screens, providing targeted illumination of the work area. Additional features may include attachable magnifying lenses for enhanced visibility, sensors to automatically adjust screen dimness based on their state (e.g., collapsed or extended), and options to connect external screens for greater flexibility in collaborative or specialized applications.

The disclosed embodiments address the limitations of conventional systems by offering a more adaptable and multifunctional solution. The inclusion of at least one lighting element, such as an LED, positioned along an edge of the housing enables focused illumination that enhances visibility of the welding area. For example, the first housing may include a first lighting element, while the second housing may include a second lighting element that provides targeted illumination without obstructing the operator's or observer's view through the dimming screens. The placement of these lighting elements works in conjunction with the adjustable screens and flexible support structure to improve visibility, comfort, and accuracy during welding operations.

Figure 1:
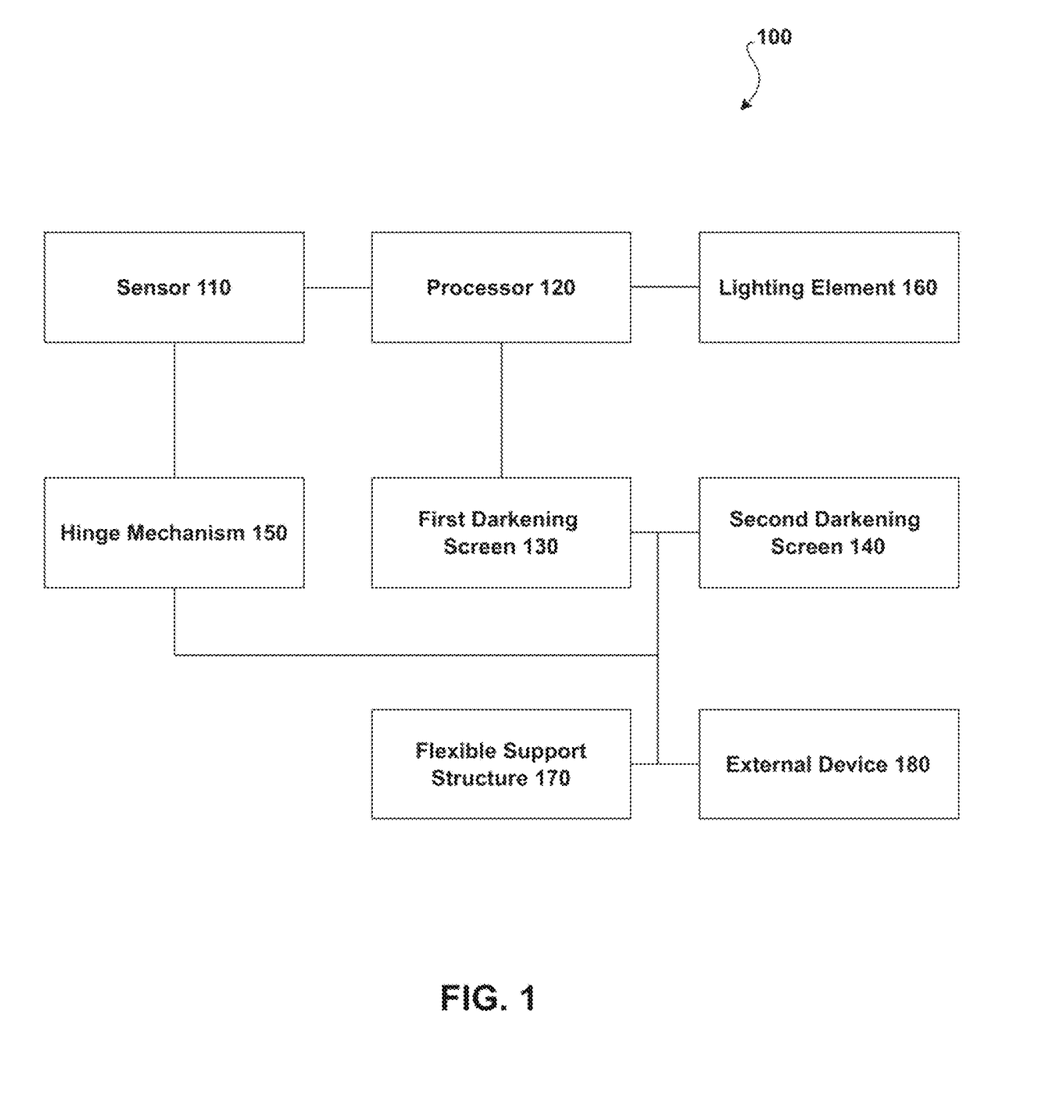
FIG. 1 illustrates a block diagram of a system for operating a protective viewing apparatus, according to an embodiment.

FIG. 1 represents a block diagram of a system 100 for operating an apparatus for enhancing visibility and safety during welding operations, according to an embodiment. The system 100 includes a sensor 110 and a processor or microcontroller 120. These components are configured for monitoring and controlling the apparatus's functions. The apparatus also integrates additional components, such as a first darkening screen 130 and a second darkening screen 140. A hinge mechanism 150 is included to enable relative movement between the screens. While these components are external to the computer system, they work in coordination with the processor 120.

The sensor 110 is integrated into the hinge mechanism 150 that connects the housings of the darkening screens 130 and 140. The hinge mechanism 150 may include a friction-based mechanism including a friction pad or surface within the hinge component. The friction pad or surface is configured to provide adjustable resistance when the first housing 130 and the second housing 140 are rotated or repositioned relative to each other. The friction pad or surface is further configured to maintain a selected angle of the first darkening screen 110 and second darkening screen 120 relative to each other.

The sensor detects the relative positions or states of the screens. It determines whether the screens are collapsed to act as a single screen, extended outward to function as two separate screens, or positioned at an intermediate angle. Based on the input from the sensor, the processor 120 adjusts the dimness of the screens to optimize visibility during operation. The processor 120 also manages a lighting element 160. The lighting element 160 is positioned on the housing or the flexible support structure 170 and operates independently of the darkening screens. For example, if the sensor detects that the screens are in an abutted state, the processor 120 activates the lighting element 160 to illuminate the work area. This independent operation provides consistent illumination regardless of the state of the screens.

The hinge mechanism 150, such as a motorized hinge or servo-driven actuator, allows the screens to move automatically. It is connected to the processor 120, which sends control signals to adjust the screens' positions. These adjustments can be based on user input, predefined settings, or feedback from the sensor 110. This setup enables the screens to be repositioned without requiring manual effort. The integration of automated positioning improves usability and allows the apparatus to accommodate a variety of operator preferences and working conditions.

The darkening screens 130 and 140 are configured to operate in multiple modes. They can collapse together to function as a single screen, extend outward as independent screens, or operate in synchronized mode. This flexibility makes the apparatus suitable for both single-user and collaborative scenarios. In some configurations, the apparatus may connect to an external device 180 with a separate screen. This external device 180 can function in coordination with the built-in screens or operate independently.

The processor 120 may be configured for processing input from sensors, controlling the screens' dimness and orientation, and controllably operating the lighting element 160. The modular design of the apparatus allows the apparatus to adapt to specific tasks or conditions, such as connecting to external devices or adjusting for unique welding scenarios.

Figure 2:
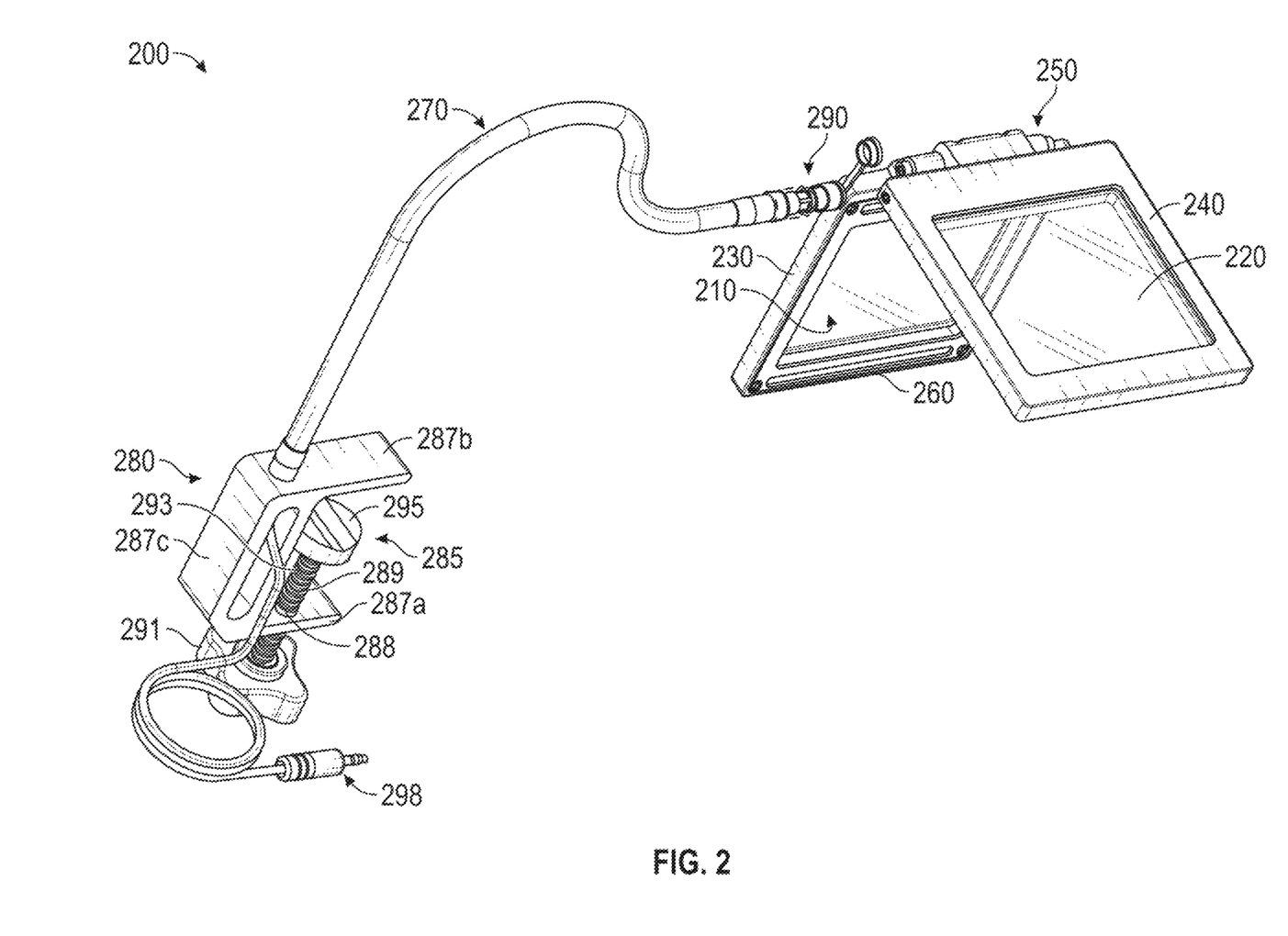
FIG. 2 illustrates a perspective view of a protective viewing apparatus, according to an embodiment.

FIG. 2 representatively illustrates a perspective view of an apparatus 200 for enhancing visibility and ensuring operator safety during a welding operation, according to an embodiment. The apparatus 200 may include a first darkening screen 210 and a second darkening screen 220. The first darkening screen 210 and the second darkening 220 may each be configured to darken prior to or during a welding operation. In an embodiment, the first darkening screen 210 and the second darkening screen 220 may be configured to darken immediately before a welding operation, such as milliseconds before the welding operation begins after the apparatus 200 is connected to a welder or power source.

The first darkening screen 210 and the second darkening screen 220 may be configured to transition from a transparent or non-darkened state to a darkened state prior to or substantially contemporaneous with the initiation of a welding operation. This transition is triggered by the detection of conditions associated with the start of welding activity, such as electrical signals, changes in light intensity, or the activation of a welding arc. The darkening occurs either immediately before or at approximately the same time as the welding operation begins. The timing of the transition is calibrated to ensure the operator's eyes are protected from the intense light and radiation emitted during welding, without noticeable delay or lag.

For example, suitable transition times may range from 1 millisecond (ms) to 5 milliseconds, depending on the intensity of the welding arc and the specific input conditions detected. In high-intensity welding operations, a transition time of 1 to 2 milliseconds provides immediate protection against sudden flashes of light. For moderate-intensity operations, a slightly longer transition time, such as 3 to 5 milliseconds may be suitable.

The apparatus 200 may also include a first housing 230 and a second housing 240, each configured to enclose, support, or otherwise secure the first darkening screen 210 and the second darkening screen 220, respectively. The first housing 230 and the second housing 240 provide a protective structure for the first darkening screen 210 and the second darkening screen 220 and may be constructed from durable materials suited for the high-temperature and high-impact conditions commonly encountered in welding environments.

The first darkening screen 210 and second darkening screen 220 used in the apparatus 200 may be constructed from materials specifically chosen for their ability to withstand high temperatures, resist impact, and provide clear and reliable darkening functionality during welding operations. Suitable materials include polycarbonate-based composites, tempered glass, silicon-coated glass, acrylic-based materials, and quartz glass. Other materials include ceramic-coated substrates, electrochromic glass, and photochromic polymers that adjust their tint in response to changing light conditions, as well as high-performance thermoplastics such as polyetheretherketone (PEEK). Metallized glass layers, including thin metal coatings to reflect and block harmful radiation and nanoparticle-infused films, are also suitable. Materials such as graphene-coated substrates, high-strength laminated glass, and aluminosilicate glass may further be used. Any suitable UV and infrared-blocking film configured to protect the operator and viewer's eyes from harmful radiation while ensuring clear visibility of the workpiece may be used.

The first housing 230 and the second housing 240 are coupled to each other via a hinge 250 or another rotatable component. The hinge 250 connects the first housing 230 and the second housing 240 in a manner that allows them to rotate or pivot relative to each other. This rotational movement enables the first darkening screen 210 and second darkening screen 220 to be adjusted to various positions to accommodate different welding scenarios or user preferences. For example, the hinge 250 allows the apparatus to be configured so that the operator views the welding area through the first darkening screen 210, while an observer or assistant simultaneously views the welding area from a different angle through the second darkening screen 220, or vice versa. This dual-screen configuration may allow the operator and viewer to have clear and unobstructed views of the workpiece from their respective vantage points.

The hinge 250, or any equivalent rotatable component, is configured to provide precise and stable adjustments to the relative orientations of the first housing 230 and the second housing 240. For instance, the hinge 250 may include a locking component or friction-based mechanism to hold the first housing 230 and the second housing 240 securely at a desired angle and prevent unintended movement during use. This adjustability allows the first darkening screen 210 and the second darkening screen 220 to be oriented for optimal viewing, such that both the operator and observer can maintain proper posture and visibility while working. The ability to independently align the first darkening screen 210 and the second darkening screen 220 for multiple users makes the apparatus 200 suitable for a wide range of welding applications.

The apparatus 200 may include a lighting element 260 configured to illuminate a work area to allow the operator to use both the welder and the apparatus 200. The apparatus 200 may also include a flexible support structure 270 that is configured to position the first housing 230, second housing 240, the first darkening screen 210 and the second screen 220 in adjustable positions and orientations. In one embodiment, the flexible support structure 270 may comprise a flexible gooseneck with a hollow interior.

The flexible support structure 270 of the apparatus 200 may further include a telescoping function that allows its length to be extended or shortened. This telescoping function or feature may allow the flexible support structure 270 to be adjusted for positioning the darkening screens 210, 220. By extending the flexible support structure 270, the viewer or operator can position the first darkening screen 210 and the second darkening screen 220 further away to achieve a broader field of view or create additional distance for safety and comfort. Shortening the flexible support structure brings the first darkening screen 210 and the second darkening screen 220 closer to the workpiece and allows for better visibility and focus on the welding piece.

The telescoping function operates through an extendable section of the flexible support structure 270 and may include a locking mechanism or friction-based adjustment to hold the desired length securely. The welder can use this feature to raise or lower the first darkening screen 210 and the second darkening screen 220 to align them with their line of sight. The observer can independently adjust the length to position their screen for an unobstructed view of the weld area without interfering with the welder's angle.

This functionality is particularly beneficial in dynamic welding environments, where the positions of the workpiece, operator, and observer frequently change. The telescoping support structure provides both the welder and the observer a clear and adjustable view of the weld area. It also allows the apparatus 200 to adapt to different workspace sizes, including both tight or open environments while maintaining visibility of the weld area.

Alternatively, the flexible support structure 270 may include an articulating arm with multiple pivot points and locking joints. Other contemplated embodiments include a ball-and-socket system with adjustable tension or a magnetic track system that allows sliding and repositioning of the first housing 230, the second housing 240, the darkening screen 210, and the second darkening screen 220 along a defined path. The ball-and-socket joint is configured to enable a user to adjust the first darkening screen 210 and the second darkening screen 220 in a first direction and a second direction relative to the weld area. In certain embodiments, the flexible support structure 270 includes an extendable section configured to increase its reach for positioning the first housing 230 and the second housing 240 at greater distances from a mounting mechanism 280.

The mounting mechanism 280 may be configured to secure the apparatus 200 to a surface and a detachable connector 290 for coupling the first housing 230 and the second housing 240 to the flexible support structure 270. The mounting mechanism 280 may comprise a clamp 285 or base located at a second end of the gooseneck tube, where the mounting mechanism is configured to securely attach the apparatus 200 to the surface and allow routing of electrical connections through the flexible support structure 270.

In an embodiment, the clamp 285 may be a C-shaped clamp. The C-shaped clamp may include three legs, including a first leg 287a, a second leg 287b, and a vertical third leg 287c that connects the first and second legs. The first leg 287a may include an aperture 288 through which a screw 289 passes. A clamp pad, pressure pad, or foot pad 295 may be affixed to one end of the screw 289 and is configured to contact the surface of a table or another object to secure the clamp 285 thereto without causing damage to the surface. The screw 289 passes through the aperture 288 in the first leg 287a and may connect to a handle 291 on an opposite end of the screw 289 to enable an operator to tighten the clamp 285 onto the surface or table.

The clamp 285 may further include an opening 293 on one side to allow a wire harness 298, electrical connections, or other wires to pass through. The wires can then extend upward through a junction where the flexible support structure 270 attaches to the C-shaped body of the clamp. From there, the wires may continue through the hollow interior of the flexible support structure 270 to connect to a connector located on the housing or the darkening screens in order to enable power delivery to the apparatus components such as the first darkening screen 210, the second darkening screen 220 and lighting element 260.

Figure 3:
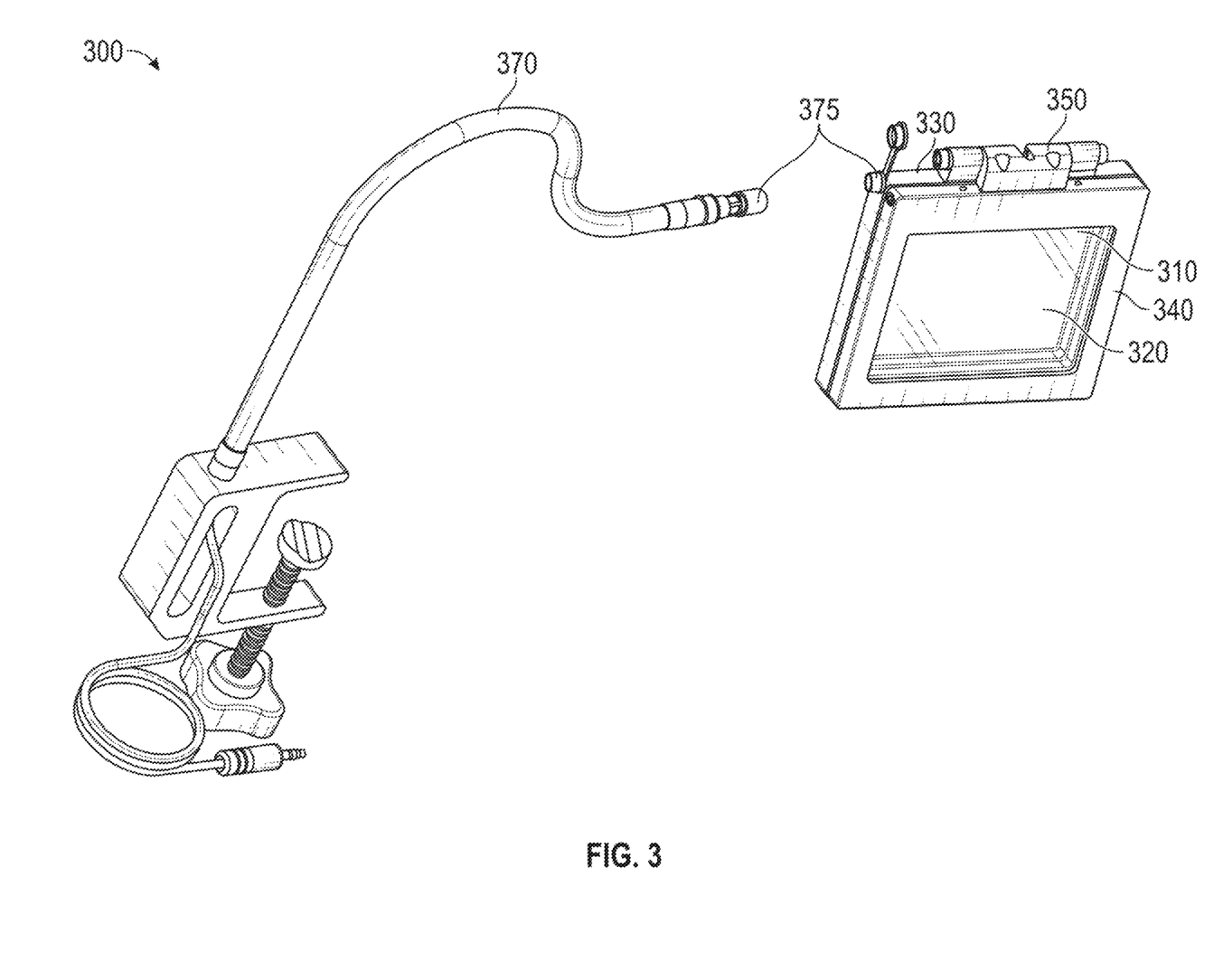
FIG. 3 illustrates a perspective view of a protective viewing apparatus, according to an embodiment.

FIG. 3 representatively illustrates a perspective view of an apparatus 300 for enhancing visibility and safety during welding operations, according to an embodiment. The apparatus 300 may include a first darkening screen 310 and a second darkening screen 320, along with a first housing 330 and a second housing 340 for enclosing, containing, or otherwise housing the first darkening screen 310 and second darkening screen 320, respectively. As shown in this embodiment, the first darkening screen 310 and the second darkening screen 320 may be rotated via a hinge mechanism 350 and positioned to abut each other when there is no observer and only an operator using the apparatus 300. In this configuration, the first darkening screen 310 and the second darkening screen 320 may align such that the operator views the welding area through both screens simultaneously. The screens may collapse together to function as a single screen by abutting each other, adjust their level of dimness based on a sensor detecting the collapsed state, or extend outward to function as two separate screens.

Furthermore, the first darkening screen 310 and the second darkening screen 320 may be capable of operating either independently or in a synchronized manner, depending on the needs of the user or the specific welding scenario. Independent operation means that each darkening screen can function autonomously, adjusting its dimness level, activation timing, or response to external conditions separately from the other screen. For example, one screen can darken in response to welding activity visible to an observer, while the other screen remains unaffected or adjusts to a different level of dimness based on the operator's requirements. This mode is particularly useful when the operator and observer are positioned at different angles or distances from the workpiece and require unique visual adjustments.

Synchronized operation, on the other hand, allows the two screens to function in unison. In this mode, both screens darken simultaneously and maintain the same dimness level and timing in response to welding activity. This provides consistency when the operator and observer need identical views of the welding process, such as in collaborative scenarios where both rely on the same lighting and visibility conditions.

The apparatus 300 further includes a flexible support structure 370 that is detachably coupled to a connector 375, which may be located on the first housing, the second housing, or positioned between them at a connection point. The connector 375 may comprise an electrical connection that utilizes a snap-in mechanism, a magnetic coupling, a depress-to-release mechanism, or a four-pin connector with wires soldered on either end. This connector 375 is configured to enable a darkening screen to be easily swapped for another screen and features a spring-loaded self-latching mechanism that unlocks when pressed.

In alternative embodiments, the connector 375 may employ a bayonet-style mechanism for secure and rapid attachment or detachment, a threaded coupling for greater stability during heavy use, or a clamp-style locking system to ensure enhanced mechanical security. The electrical connection within the connector 375 may further include a quick-release plug-and-socket interface to allow an operator to replace the screen without the need for tools.

In some configurations, the connector 375 may include an integrated alignment guide, such as pins or grooves. To enhance durability and protect the internal components from environmental factors, the connector 375 may also incorporate waterproof or dust-resistant sealing features. For added versatility, the connector may be configured to support additional accessories, such as external displays, sensors, or auxiliary lighting elements.

Figure 4:
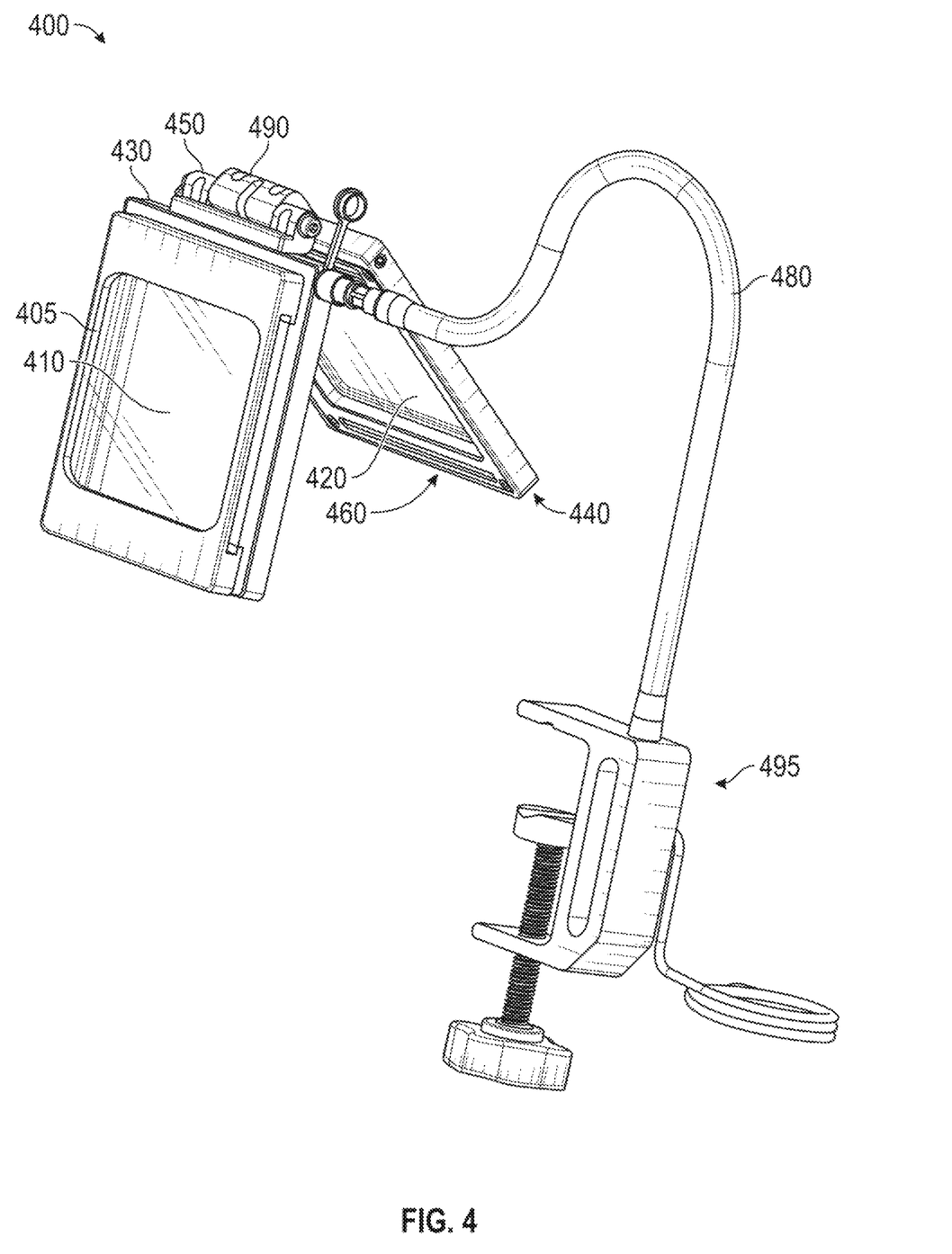
FIG. 4 illustrates a perspective view of a protective viewing apparatus, according to an embodiment.

FIG. 4 representatively illustrates a perspective view of an apparatus 400 configured to enhance visibility and safety during welding operations, according to an embodiment. The apparatus 400 may include a magnifying lens 405 configured to be attachable to one or both of a first housing 430 and a second housing 440 and is positioned in front of their respective darkening screens 410 and 420 to improve the visibility of a workpiece for the operator and/or welder. The attachment of the magnifying lens 405 may vary depending on operational needs. It can be attached to either housing 430 or 440 individually or to both housings simultaneously so that it can provide magnification across both screens. The magnifying lens 405 may be affixed to the housing using magnets 450. In alternative embodiments, the magnifying lens 405 may be secured using other suitable methods, such as clips for quick attachment and detachment, adhesive strips for a semi-permanent setup, snap-on mechanisms for secure but tool-free application, or screw fittings. The attachment mechanism may incorporate adjustable brackets or arms to enable fine-tuning of the magnifying lens position relative to the screen.

The magnifying lens 405 may be an adjustable magnifying lens coupled to at least one of the first darkening screen 410 and the second darkening screen 420, such that the magnifying lens is configured to be repositioned relative to the first darkening screen 410 or second darkening screen 420 to provide a variable magnification of the weld area.

In some embodiments, the apparatus 400 may use other items instead of a unifying magnifying lens 405 to improve visibility or add functionality. For instance, filters, such as polarized or anti-glare filters, may be positioned in front of the darkening screens 410 and 420 to reduce reflections and enhance visibility under varying lighting conditions. Lens array, consisting of multiple lenses configured to provide a broader field of magnification, may be used for larger workpieces or tasks requiring detailed precision. In another embodiment, a digital camera module with magnification capabilities may be included to provide a live feed of the welding area to a display screen for enhanced precision and visibility. Light-diffusing plates may be utilized to soften illumination from the lighting elements.

Suitable magnifying lenses for use in the apparatus 400 may include high-quality glass or lightweight acrylic lenses with anti-scratch and anti-fog coatings to withstand the harsh conditions of a welding environment. Fresnel lenses, which are thin and lightweight, may be used for portable or compact setups. Variable-focus lenses, which offer adjustable magnification levels, may also be utilized to allow customization depending on the workpiece size or welding requirements. Bifocal or multifocal lenses may provide clear vision at varying distances, which is particularly useful for tasks requiring frequent shifts in focus.

In one or more configurations, the apparatus 400 may support multiple interchangeable attachments, allowing the operator to swap between magnifying lenses 405, filters, and other enhancements depending on the specific task or working conditions.

At least one housing of the apparatus 400 may include a lighting element, such as an LED light, positioned along an edge, for example, the bottom edge, and extending across the length of the edge. For instance, the first housing 430 may include a first lighting element, and the second housing 440 may include a second lighting element 460. These lighting elements are configured to provide focused illumination that enhances the visibility of the work area directly in front of the respective screens. The edge-mounted lighting elements are designed to effectively direct light toward the welding area without obstructing the operator's or observer's view through the darkening screens.

The apparatus 400 may include a third lighting element positioned elsewhere on the apparatus, such as on the housing, a flexible support structure 480, or at the junction where the support structure connects to the housing. The third lighting element is configured to illuminate automatically when a sensor 490 detects that the screens are in an abutted state.

The sensor 490 triggers the first, second, and/or third lighting element to illuminate the weld area and provide adequate visibility. In an embodiment, the sensor 490 may be integrated with a hinge mechanism coupling the first housing 430 and the second housing 440. In this configuration, the sensor may detect the relative orientation or collapsed state of the first housing 430 and the second housing 440. In another embodiment, the sensor 490 may be located on one of the housings, such as the first housing 430 or second housing 440, and is positioned to detect proximity, movement, or alignment of the screens.

Alternatively, the sensor 490 may be embedded within the flexible support structure 480 to monitor the positional adjustments of the housings and screens relative to the weld area. In some configurations, the sensor 490 may be external to the housings and mounted on the apparatus's mounting component 495. In this configuration, the sensor 490 may be configured to detect changes in the overall orientation or positioning of the apparatus relative to the work surface.

The sensor 490 may utilize various detection technologies, including infrared, proximity sensing, magnetic field sensing, or optical sensing, to determine the spatial arrangement of the screens and trigger the appropriate lighting elements.

The first lighting element, second light element 460 on the first housing 430 and the second housing 440 and the third lighting element positioned elsewhere on the apparatus 400 work in tandem to enhance the operator's ability to see the welding area under varying conditions. For example, when the first darkening screen 410 and the second darkening screen 420 are extended and used by the operator and an observer, the first and second edge-mounted lighting elements can provide localized illumination specific to their respective viewing angles. When the darkening screens are collapsed together and used solely by the operator, the third lighting element is turned on to provide additional illumination to the entire work area.

Figure 5:
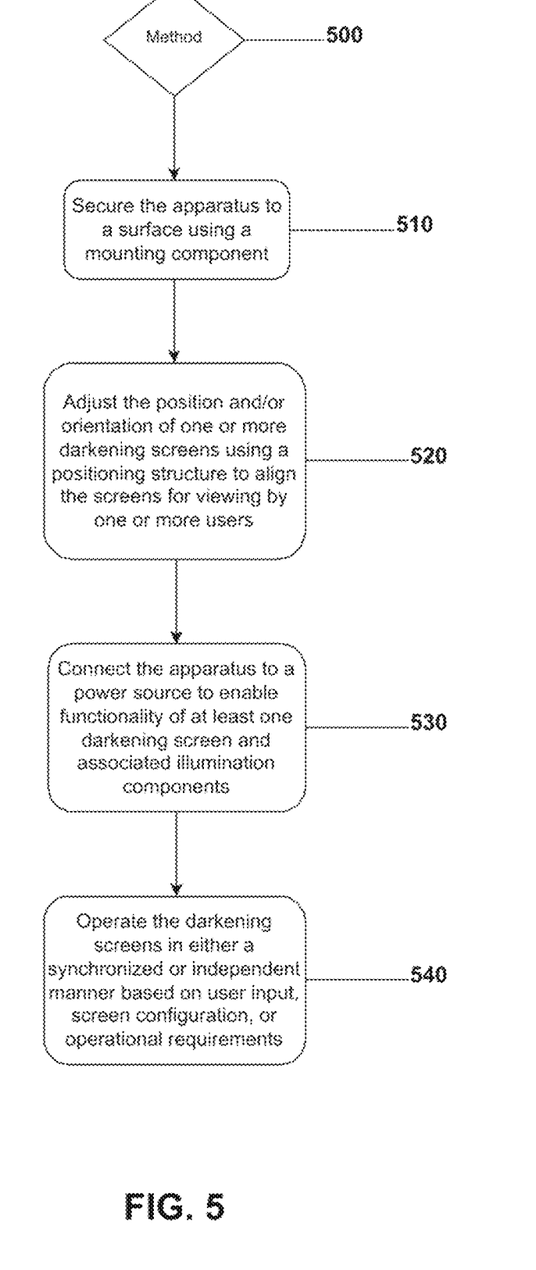
FIG. 5 illustrates a flow diagram for operating a protective viewing apparatus, according to an embodiment.

FIG. 5 illustrates a flow diagram for operating an apparatus for enhancing visibility and safety during welding operations, according to an embodiment. The method 500 may include securing the apparatus to a stable surface using a mounting mechanism 510. Once the apparatus is secured, the method may involve adjusting the orientation of one or more darkening screens using a flexible gooseneck tube to position the screens at desired viewing angles for both a welder and an observer 520. The method may further include connecting the apparatus to a power source to activate the darkening screens and illumination features 530.

The method 500 may involve operating the darkening screens in a manner that allows for simultaneous or separate darkening, depending on user preference, screen configuration, or operational conditions 540. The method may include adjusting the orientation of the first and second darkening screens by using a flexible gooseneck tube to position the screens in a desired location relative to the welder and observer and utilizing a hinge mechanism coupling the first and second housings to further adjust the viewing angles of the screens for the welder and the observer.

The method may also include automatically adjusting the dimness level of the darkening screens based on a sensor detecting whether the screens are in a collapsed or extended state. The method 500 may also include connecting an external device containing a separate screen to the apparatus, where the external screen operates either in coordination with or independently from the first and second darkening screens.

The method may include attaching an optional magnifying lens to the housing of at least one darkening screen to enhance the visibility of the workpiece during welding operations.

A feature illustrated in one of the figures may be the same as or similar to a feature illustrated in another of the figures. Similarly, a feature described in connection with one of the figures may be the same as or similar to a feature described in connection with another of the figures. Unless expressly described otherwise, the same or similar features may be noted by the same or similar reference characters. Additionally, the description of a particular figure may refer to a feature not shown in the particular figure. The feature may be illustrated in and/or further described in connection with another figure.

Elements of processes (i.e., methods) described herein may be executed in one or more ways, such as by a human, a processing device, mechanisms operating automatically or under human control, and so forth. Additionally, although various elements of a process may be depicted in the figures in a particular order, the elements of the process may be performed in one or more different orders without departing from the substance and spirit of the disclosure herein.

The preceding description sets forth numerous details such as examples of specific systems, components, methods, and so forth, to provide a good understanding of several implementations. However, it will be apparent to one skilled in the art that at least some implementations may be practiced without these specific details. In other instances, well-known components or methods are not described in detail or are presented in simple block diagram format to avoid unnecessarily obscuring the present implementations. Thus, the specific details set forth above are merely exemplary. Particular implementations may vary from these exemplary details and still be within the scope of the present implementations.

Related elements in the examples and/or embodiments described herein may be identical, similar, or dissimilar in different examples. For brevity and clarity, related elements may not be redundantly explained. Instead, the use of same, similar, and/or related element names and/or reference characters may cue the reader that an element with a given name and/or associated reference character may be similar to another related element with the same, similar, and/or related element name and/or reference character in an example explained elsewhere herein. Elements specific to a given example may be described regarding that particular example. A person having ordinary skill in the art will understand that a given element need not be the same and/or similar to the specific portrayal of a related element in any given figure or example to share features of the related element.

It is to be understood that the foregoing description is intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions, and/or properties disclosed above both explicitly and inherently. Where the disclosure or subsequently filed claims recite "a" element, "a first" element, or any such equivalent term, the disclosure or claims are to be understood to incorporate one or more such elements, neither requiring nor excluding two or more such elements.

As used herein "same" means sharing all features and "similar" means sharing a substantial number of features or sharing materially important features even if a substantial number of features are not shared. As used herein "may" should be interpreted in a permissive sense and should not be interpreted in an indefinite sense. Additionally, use of "is" regarding examples, elements, and/or features should be interpreted to be definite only regarding a specific example and should not be interpreted as definite regarding every example. Furthermore, references to "the disclosure" and/or "this disclosure" refer to the entirety of the writings of this document and the entirety of the accompanying illustrations, which extends to all the writings of each subsection of this document, including the Title, Background, Brief Description of the Drawings, Detailed Description, Claims, Abstract, and any other document and/or resource incorporated herein by reference.

As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B, and C; A, B, C, and D; and so forth. The bounds of an "and/or" list are defined by the complete set of combinations and permutations for the list.

Where multiples of a particular element are shown in a FIG. or figure, and where it is clear that the element is duplicated throughout the FIG., only one label may be provided for the element, despite multiple instances of the element being present in the FIG. Accordingly, other instances in the FIG. of the element having identical or similar structure and/or function may not have been redundantly labeled. A person having ordinary skill in the art will recognize based on the disclosure herein redundant and/or duplicated elements of the same FIG. Despite this, redundant labeling may be included where helpful in clarifying the structure of the depicted examples.

The Applicant(s) reserves the right to submit claims directed to combinations and sub-combinations of the disclosed examples that are believed to be novel and non-obvious. Examples embodied in other combinations and sub-combinations of features, functions, elements, and/or properties may be claimed through amendment of those claims or presentation of new claims in the present application or in a related application. Such amended or new claims, whether they are directed to the same example or a different example and whether they are different, broader, narrower, or equal in scope to the original claims, are to be considered within the subject matter of the examples described herein.

The invention claimed is:

1. An apparatus, comprising:
   a first dimming screen, wherein:
      the first dimming screen is configured:
         to be transparent when not powered; and
         to darken prior to or substantially contemporaneous with an initiation of a welding operation;
   a second dimming screen, wherein:
      the second dimming screen is configured:
         to be transparent when not powered; and
         to darken prior to or substantially contemporaneous with an initiation of a welding operation;
   a first housing comprising:
      the first dimming screen:
      a lighting element for illuminating the weld area; and
      a cable for electrically connecting the lighting element to a power source;
   a second housing comprising:
      the second dimming screen:
      a lighting element for illuminating the weld area; and
      a cable for electrically connecting the lighting element to a power source;
   a hinge component, wherein the hinge component is configured to adjust the first housing and the second housing angularly relative to each other to position the first dimming screen and the second dimming screen at an angle that provides a viewing angle of a weld area;
   a flexible gooseneck tube comprising a first end attached to at least one of:
      the first housing and the second housing; or
      a connection point between the first housing and second housing, wherein:
         the flexible gooseneck tube is adjustable to position the first dimming screen and the second dimming screen relative to:
            the weld area; and
            the viewing angle;
   a mounting component comprising a clamp or base at the second end of the gooseneck tube, wherein the mounting component is configured to attach the clamp or base to a surface; and
   a detachable connector connected to at least one of the first housing, the second housing, or the gooseneck tube, the detachable connector configured to attach the first housing and the second housing to the gooseneck tube and detach the first housing and the second housing from the gooseneck tube.

2. The apparatus of claim 1, further comprising a magnifying lens configured to be attachable to at least one of the first housing or the second housing, wherein the magnifying lens is positioned in front of at least one of the first dimming screen and the second dimming screen.

3. The apparatus of claim 2, wherein the magnifying lens is magnetically coupled to the first housing or the second housing.

4. The apparatus of claim 1, wherein:
   the flexible gooseneck tube comprises a hollow body to route the cable; and
   the cable extends through the clamp or base and into the hollow gooseneck tube to provide electrical connectivity to the first dimming screen, the second dimming screen, the lighting element of the first dimming screen, or the lighting element of the second dimming screen.

5. The apparatus of claim 1, wherein the first dimming screen and second dimming screen are configured to:
   operate in coordination with an external device comprising a separate screen or user interface, wherein the external device is:
      connectable to a power source or welder; and
      configured to display information about or monitor the weld area; or
   operate independently of each other, wherein:
      the first dimming screen and the second dimming screen are each configured to adjust their respective dimness, activation timing, or operational state based on an input condition.

6. The apparatus of claim 1, wherein:
   the detachable connector comprises an electrical connection comprising a snap-in mechanism, a magnetic coupling, a depress-to-release mechanism, or a four-pin connector; and
   the detachable connector is configured for removal of the first dimming screen or the second dimming screen and attachment of a third dimming screen.

7. The apparatus of claim 1, wherein:
   the lighting element of the first dimming screen and the lighting element of the second dimming screen are configured to operate independently of their respective dimming screens; and
   the activation of each lighting element is configured to be performed separately from the activation of the first dimming screen and second dimming screen.

8. The apparatus of claim 1, wherein:
   the first dimming screen and second dimming screen are configured to:
      collapse into a substantially overlapping position to function as a single screen;

adjust their respective dimness levels based on input from a sensor detecting their positioning relative to each other; or extend apart to function as separate screens; and at least one lighting element is:
  positioned on or near the apparatus, located on the housing or on one of the dimming screens in a manner that remains unobstructed when the first dimming screen and the second dimming screen are collapsed relative to each other; and
  configured to illuminate the weld area in response to the sensor detecting the overlapping position of the first dimming screen and the second dimming screen.

9. A method, comprising:

securing a device to a surface using a mounting component;

adjusting the position or orientation of a first dimming screen and a second dimming screen of the apparatus using a positioning structure to align the first dimming screen and second dimming screen for viewing by one or more users;

adjusting the orientation of the first dimming screen and second dimming screen by:
  positioning the first dimming screen and second dimming screen in a location relative to a welder and observer using a flexible support structure; and
  adjusting a viewing angle of the first dimming screen or the second dimming screen using a hinge that couples the first dimming screen to the second dimming screen connecting the device to a power source to supply power to the first dimming screen, the second dimming screen, or a lighting component; and operating the first dimming screen and second dimming screen in a synchronized or independent mode based on a user input.

10. The method of claim 9, further comprising adjusting a dimness level of the first dimming screen or the second dimming screen based on input from a sensor configured to detect whether the first dimming screen and the second dimming screen are:
  in a collapsed position relative to each other; or
  in an extended position relative to each other.

11. The method of claim 9, further comprising:
  connecting an external device that includes a third dimming screen to the device; and
  configuring the third dimming screen to:
    operate in coordination with the first dimming screen and the second dimming screen; or
    operate independently of the first dimming screen and the second dimming screen.

12. The method of claim 9, further comprising:
attaching a magnifying lens to at least one of the first housing or the second housing; and
coupling the magnifying lens to the respective housing in a position overlapping and located in front of the first dimming screen or the second dimming screen.

13. An apparatus, comprising:
a first housing, wherein the first housing comprises:
  a first dimming screen configured to darken prior to or during a welding operation; and
  a lighting element configured to illuminate a work area;
a second housing, wherein the second housing comprises:
  a second dimming screen configured to darken prior to or during a welding operation; and
  a lighting element configured to illuminate a work area; and
a hinge component, wherein:
  the first housing and the second housing are connected via the hinge component; and
  the hinge component positions the first dimming screen and the second dimming screen at an angle that provides a viewing angle of a weld area;
a flexible support structure, wherein the flexible support structure is configured to adjustably position the first dimming screen and the second dimming screen relative to the weld area;
a mounting component, wherein the mounting component is configured to secure the apparatus to a surface; and
a detachable connector, wherein the detachable connector is configured to couple the first housing, the second housing, or a connection point between the first housing and the second housing, to the flexible support structure.

14. The apparatus of claim 13, further comprising a sensor coupled to the hinge component, wherein the sensor is configured to:
  detect an angle of the first housing relative to the second housing; and
  adjust an illumination of the lighting element in the first housing or the second housing based on the detected angle.

15. The apparatus of claim 13, wherein the hinge component comprises a manual locking component configured to hold the first dimming screen and second dimming screen in a fixed position relative to each other.

16. The apparatus of claim 13, wherein the flexible support structure comprises an extendable or telescoping body configured to adjust its length to position the first dimming screen and the second dimming screen at a variable distance from the mounting component.

17. The apparatus of claim 13, wherein:
the flexible support structure comprises a ball-and-socket joint at the connection point, wherein the ball-and-socket joint is configured to:
  to adjust the first dimming screen and the second dimming screen in a first direction and a second direction opposite the first direction relative to the weld area.

18. The apparatus of claim 13, wherein the hinge component comprises a friction-based mechanism comprising a friction pad or surface within the hinge component, wherein:
  the friction pad or surface is configured to provide adjustable resistance when the first housing and the second housing are rotated or repositioned relative to each other; and
  the friction pad or surface is further configured to hold the first dimming screen and the second dimming screen at a selected angle relative to each other.

19. The apparatus of claim 13, further comprising an adjustable magnifying lens coupled to the first housing or the second housing, wherein:
  the magnifying lens is configured to be repositioned relative to the first dimming screen or the second dimming screen; and
  the magnifying lens is further configured to provide a variable magnification of the weld area.

* * * * *